United States Patent
Tyndal

[11] Patent Number: 6,024,573
[45] Date of Patent: Feb. 15, 2000

[54] EDUCATIONAL BANK

[76] Inventor: Loriel Tyndal, 13304 Fort Washington Rd., Fort Washington, Md. 20744

[21] Appl. No.: 08/734,749

[22] Filed: Oct. 21, 1996

[51] Int. Cl.[7] .................................................. G09B 19/00
[52] U.S. Cl. ........................................ 434/201; 434/188
[58] Field of Search .................................. 434/107, 110, 434/201, 188, 191, 209, 322, 327, 335; 705/18; 235/1 D, 1 E

[56] References Cited

U.S. PATENT DOCUMENTS

| | | | |
|---|---|---|---|
| 4,070,564 | 1/1978 | Tucker | 705/18 |
| 4,280,034 | 7/1981 | Ezaki et al. | 235/1 D |
| 4,359,082 | 11/1982 | Uecker et al. | 377/7 |
| 4,363,628 | 12/1982 | Kirkpatrick et al. | 434/107 |
| 4,389,194 | 6/1983 | Toll et al. | 434/201 |
| 4,959,017 | 9/1990 | Thompson et al. | 434/110 |
| 5,347,473 | 9/1994 | Hallman et al. | 434/110 |
| 5,482,487 | 1/1996 | Harris | 434/107 |

*Primary Examiner*—Glenn E. Richman
*Attorney, Agent, or Firm*—Bacon & Thomas, PLLC

[57] ABSTRACT

This invention relates to children's banks. A product which provides storage for money within the home, primarily for children, but can be used by all. The ATM bank is composed of a hard plastic shell frame for the bank portion and holder for the LED viewer, printer and calculator. The calculator component is a standard function calculator that includes deposit, withdrawal, and balance keys. A manual savings register is also an intricate component part of the invention as a learning tool. It also has a variable power supply 110V or battery.

1 Claim, 1 Drawing Sheet

EDUCATIONAL BANK

BACKGROUND OF THE INVENTION

This invention relates to children's banks. A product which provides storage for money within the home, primarily for children, but can be used by all. It is a functional product.

1. The Description of Related Art

There is a need for teaching individuals how to save and maintain records. Also it is important to be able to use calculators as part of this process. The functions of deposit and withdrawals need to be addressed as well as requesting and maintaining a balance.

In general banks for use in the home or in teaching environments are either mechanical or are used strictly as a receptacle for storing money. They provide very little if any educational value.

Patents that I found in my search were generally of the mechanical novelty items or were strictly different forms of receptacles for hold money. They did not relate to the educational aspect of saving and documentation and banking knowledge.

Patents Reviewed were as follows: U.S. Pat. Nos. 5,346,399, 4,002,335, 4,673,368, 4,297,807, 4,079,540, 3,742,641, 3,667,136, 3,650,379, 3,581,430, 3,464,693, D368790, D344107, D343220.

2. Objectives of the Invention

An objective of the ATM bank is to provide an educational tool for teaching children and young adults record keeping with respect to saving and banks.

Another objective of the invention is to provide a written and viewable display that is similar to what they would actually receive if they had went to an actual bank.

Another objective of the invention is to provide an educational tool to teach people how to save and maintain records.

With the above and other objects in view, the invention further includes the following novel features and details of construction, to be hereinafter more fully described, illustrated in the accompanying drawing and pointed out in the claim.

SUMMARY OF THE INVENTION

The ATM bank is composed of a hard plastic shell frame for the bank portion and holder for the LED viewer, printer and calculator. The calculator component is a standard function calculator that includes deposit, withdrawal, and balance keys. A manual savings register is also an intricate component part of the invention as a learning tool.

DETAILED DESCRIPTION OF THE INVENTION

Figure 1:
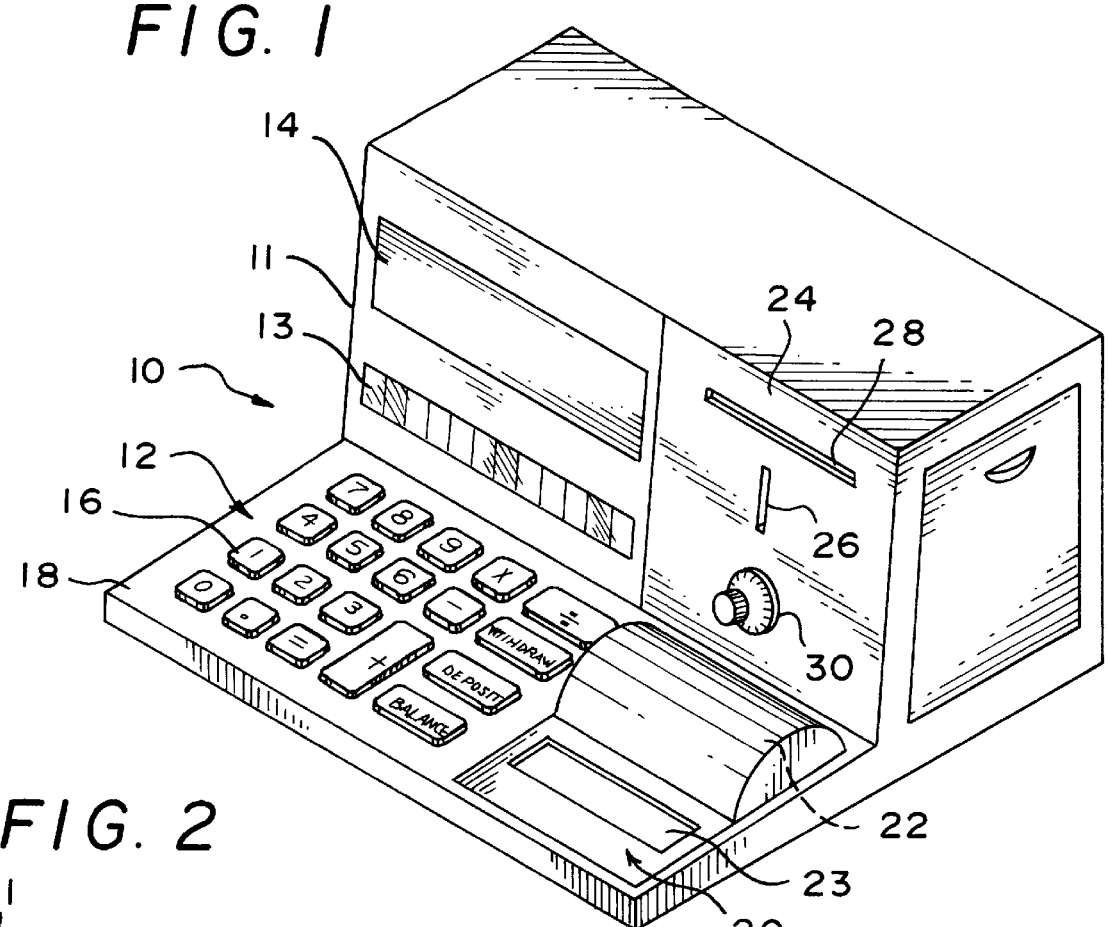
FIG. 1: is a front view of the invention. It shows the LED readout, calculator with printer and locking device.
Figure 2:
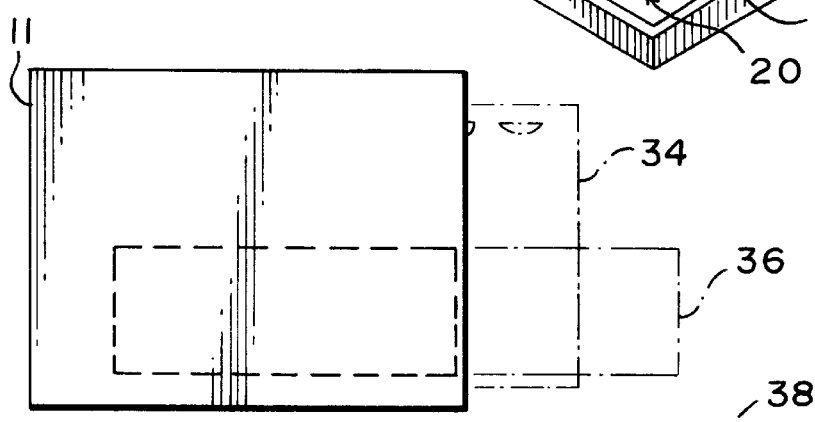
FIG. 2: is a back view showing the removable deposit drawer and variable power supply component.
Figure 3:
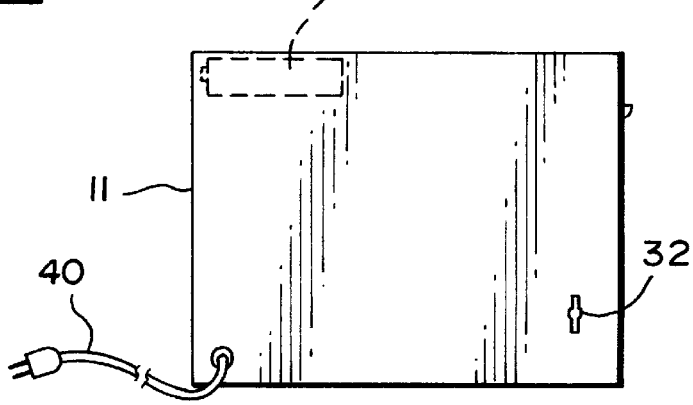
FIG. 3: shows the power supplies.

Referring to the drawing in detail figure one shows the front view win the LED display on the upper front. Calculator keys and function keys are located on the base portion of the invention and include standard keys of 0–9, +(deposit), −(withdrawal), /,x, Memory, %, and a printer. Located on the front top are the deposit slots for both coin and dollar currencies as well as a locking device (either a combination or key). The side will have a hinged door for removal of the deposit drawer and for withdrawal. The deposit drawer and outer components will be composed of hard plastic or metal.

The power supply for the ATM bank will be variable in that either batteries or electrical power 110V can be used.

It will be apparent from the foregoing description and accompanying drawings that the invention provides a very useful as well as functional invention by providing a place within the home to store loose change and money and provide the ability to maintain a record of how much has been placed in the bank. It is also an educational tool for teaching young children simple bank functions (deposit, withdrawal) and documentation of those transactions.

What is claimed is:

1. An educational bank, comprising:

a housing;

a receptacle for money movably mounted in the housing;

an opening in the housing for providing access to the receptacle and for enabling movement of the receptacle at least partially out of the housing and a securable lid for the opening that prevents access to the receptacle when secured;

at least one money depositing slot in the housing in communication with the receptacle when the receptacle is located within the housing with the lid secured;

an electronic calculator including at least numerical keys and at least addition, subtraction, division and multiplication function keys on the housing, said calculator including a paper printer and a readout device on the housing, and operable solely as a stand-alone electronic calculator independently of money deposits or withdrawals;

a source of paper for the calculator printer in the housing;

an access opening for calculator printer paper printout on the housing; and said housing including a device for receiving a power supply for the calculator and its associated readout and printer.

* * * * *